US012565965B2

(12) United States Patent
Sick et al.

(10) Patent No.: US 12,565,965 B2
(45) Date of Patent: Mar. 3, 2026

(54) HYDROGEN SUPPLY DEVICE COMPRISING A HYDROGEN TANK AS WELL AS EQUIPMENT ITEMS DISTRIBUTED IN AT LEAST ONE CONTAINER CONNECTED TO THE TANK AND AT LEAST ONE REMOVABLE CONTAINER

(71) Applicants: Airbus Operations SAS, Toulouse (FR); Airbus Operations Limited, Filton Bristol (GB)

(72) Inventors: Frédéric Sick, Toulouse (FR); Julien Laverne, Toulouse (FR); Thomas Wesoly, Labege (FR); Nicholas West, Filton Bristol (GB)

(73) Assignees: Airbus Operations SAS, Toulouse (FR); Airbus Operations Limited, Filton Bristol (GB)

( * ) Notice: Subject to any disclaimer, the term of this patent is extended or adjusted under 35 U.S.C. 154(b) by 179 days.

(21) Appl. No.: 18/525,938

(22) Filed: Dec. 1, 2023

(65) Prior Publication Data
US 2024/0183493 A1  Jun. 6, 2024

(30) Foreign Application Priority Data
Dec. 5, 2022   (FR) ...................................... 2212738

(51) Int. Cl.
*F17C 1/00* (2006.01)
*B64D 37/30* (2006.01)

(52) U.S. Cl.
CPC ............... *F17C 1/00* (2013.01); *B64D 37/30* (2013.01); *F17C 2205/0134* (2013.01);
(Continued)

(58) Field of Classification Search
CPC ........ F17C 2221/012; F17C 2205/0326; F17C 2270/0105
See application file for complete search history.

(56) References Cited

U.S. PATENT DOCUMENTS

2012/0248251 A1   10/2012  Tichborne et al.
2015/0298811 A1   10/2015  Knepple et al.
(Continued)

FOREIGN PATENT DOCUMENTS

EP          4037046 A1    8/2022
WO       2015040268 A1    3/2015

OTHER PUBLICATIONS

French Search Report for corresponding French Patent Application No. 2212738 dated Jun. 14, 2023; priority document.

*Primary Examiner* — Paul J Gray
(74) *Attorney, Agent, or Firm* — Greer, Burns & Crain, Ltd.

(57) ABSTRACT

A hydrogen supply device including at least one hydrogen tank, at least one hydrogen circuit and at least one upstream container joined to the hydrogen tank, as well as at least one removable downstream container. The upstream and downstream containers are configured to occupy an assembled state, in which the upstream and downstream containers are connected, and a detached state in which the upstream and downstream containers are not joined. The hydrogen circuit has an upstream segment positioned in the upstream container, a downstream segment positioned in the downstream container, as well as a first connection system which connects the upstream and downstream segments when the upstream and downstream containers are in the assembled state. Thus, each downstream container may be uninstalled and removed from the aircraft without it being necessary to uninstall the hydrogen tank.

15 Claims, 4 Drawing Sheets

(52) U.S. Cl.
CPC .................. *F17C 2221/012* (2013.01); *F17C 2223/0161* (2013.01); *F17C 2227/0135* (2013.01); *F17C 2227/03* (2013.01); *F17C 2265/066* (2013.01); *F17C 2270/0186* (2013.01)

(56) References Cited

U.S. PATENT DOCUMENTS

| | | | |
|---|---|---|---|
| 2022/0163170 | A1 | 5/2022 | Bensadoun et al. |
| 2022/0246971 | A1 | 8/2022 | Fernandez Garcia et al. |

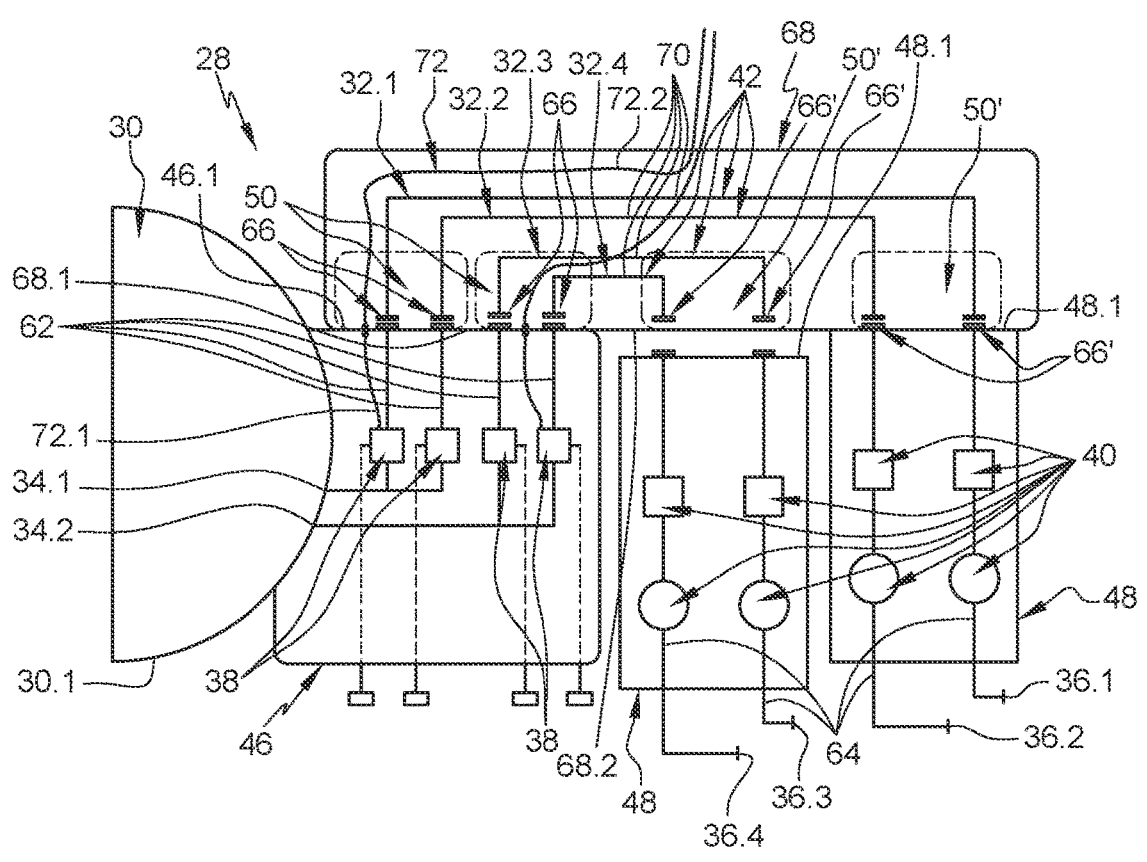
Fig. 3
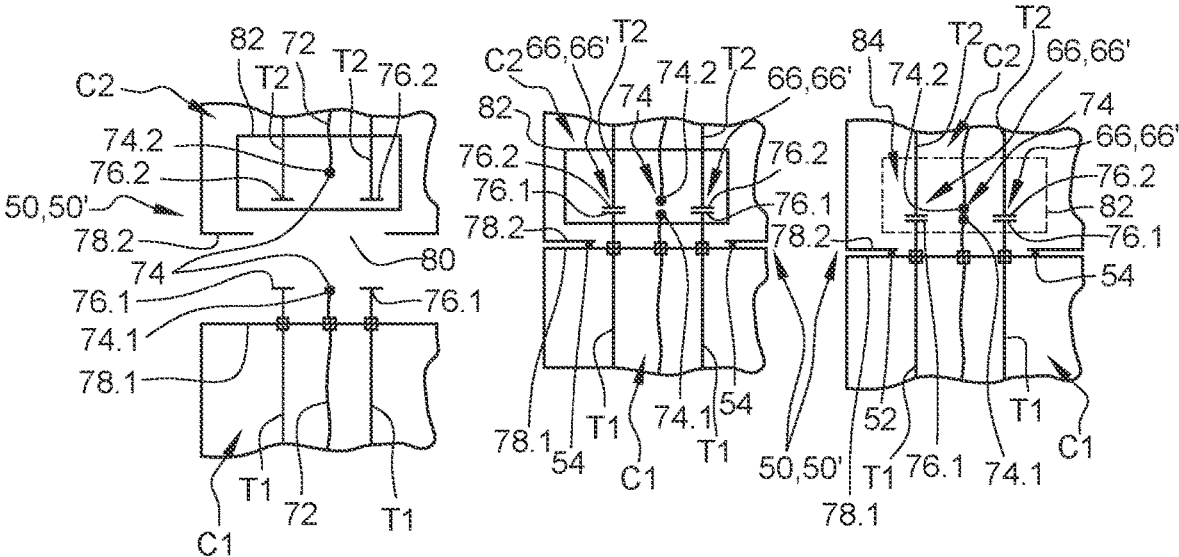
Fig. 4A          Fig. 4B          Fig. 4C

HYDROGEN SUPPLY DEVICE COMPRISING A HYDROGEN TANK AS WELL AS EQUIPMENT ITEMS DISTRIBUTED IN AT LEAST ONE CONTAINER CONNECTED TO THE TANK AND AT LEAST ONE REMOVABLE CONTAINER

CROSS-REFERENCES TO RELATED APPLICATIONS

This application claims the benefit of the French patent application No. 2212738 filed on Dec. 5, 2022, the entire disclosures of which are incorporated herein by way of reference.

FIELD OF THE INVENTION

The present application relates to a hydrogen supply device comprising a hydrogen tank as well as equipment items distributed in at least one container connected to the tank and at least one removable container. The invention also relates to an aircraft having at least one such hydrogen supply device.

BACKGROUND OF THE INVENTION

As illustrated in FIG. 1, a hydrogen supply device of an aircraft comprises at least one hydrogen tank 10 as well as a plurality of hydrogen circuits 12.1 to 12.4, each having at least one upstream end 14.1 to 14.2 connected to the hydrogen tank 10 and at least one downstream end 16.1 to 16.4 connected, in particular, to at least one hydrogen engine or to at least one fuel cell.

The terms upstream and downstream refer to the direction of flow of the hydrogen in each of the hydrogen circuits, which flows from upstream to downstream.

Each hydrogen circuit 12.1 to 12.4 comprises lines 18 as well as various equipment items 20, such as pumps, sensors, valves or exchangers, for example, which are connected to one another by the lines 18.

The hydrogen supply device may comprise at least one electrical cable 22 connected to at least one equipment item 20.

According to one configuration, the hydrogen is stored in the hydrogen tank 10 in the cryogenic state and the hydrogen supply device comprises a high-pressure pump for pressurizing the hydrogen as well as a heat exchanger configured to warm the hydrogen, which passes from the liquid state to the gaseous state.

The lines 18 are double-skin tubes in order to prevent any leak of hydrogen. Certain equipment items 20 such as certain valves, for example, are configured to ensure a high level of safety in terms of hydrogen leakage. For other equipment items 20 such as the pumps, for example, it proves complicated to obtain a high level of safety in terms of hydrogen leakage, or this leads to high costs for these equipment items.

Consequently, as illustrated in FIG. 1, the equipment items 20, the lines 18, as well as the electrical cables 22, are positioned in an airtight container 24 into which an inert gas is injected or in which a vacuum is created.

This container 24 is connected in a leaktight manner to the hydrogen tank 10.

In order to be able to carry out maintenance or repair operations relating to the equipment items 20 positioned in the container 24, it is necessary to uninstall the hydrogen tank 10 and the container 24 in order to remove them from the aircraft so as to be able to open the container 24 and access the equipment items 20. Once the maintenance or repair operation has been performed, the hydrogen tank 10 and the container 24 are reinstalled in the aircraft.

This embodiment is not satisfactory because it leads to significant downtimes of the aircraft.

An object of the present invention is to overcome all or some of the disadvantages of the prior art.

SUMMARY OF THE INVENTION

For this purpose, the invention relates to a hydrogen supply device comprising at least one hydrogen tank, at least one hydrogen circuit, as well as at least one upstream container joined to the hydrogen tank.

According to the invention, the hydrogen supply device comprises at least one removable downstream container, the upstream and downstream containers being configured to occupy an assembled state, in which the upstream and downstream containers are connected, and a detached state in which the upstream and downstream containers are not joined, the hydrogen circuit having an upstream segment positioned in the upstream container, a downstream segment positioned in the downstream container, as well as a first connection system which connects the upstream and downstream segments when the upstream and downstream containers are in the assembled state.

Thus, each downstream container may be uninstalled and removed from the aircraft without it being necessary to uninstall the hydrogen tank. This solution contributes to improving the maintenance of the downstream containers, and ultimately of the hydrogen supply device.

According to another characteristic, the upstream and downstream containers respectively comprise upstream and downstream junction faces which are positioned level with a junction zone and are brought together in the assembled state, the first connection system being positioned in proximity to the junction zone when the upstream and downstream containers are in the assembled state.

According to another characteristic, the hydrogen supply device comprises at least one removable intermediate container interposed between the upstream and downstream containers, the upstream and intermediate containers being configured to occupy an assembled state, in which the upstream and intermediate containers are brought together in a first junction zone, as well as a detached state in which the upstream and intermediate containers are separated, the downstream and intermediate containers being configured to occupy an assembled state, in which the downstream and intermediate containers are brought together in a second junction zone, as well as a detached state in which the downstream and intermediate containers are separated. Furthermore, the hydrogen circuit has an intermediate segment interposed between the upstream and downstream segments and positioned in the intermediate container, a first connection system which connects the upstream and intermediate segments and is positioned level with the first junction zone, as well as a second connection system which connects the downstream and intermediate segments and is positioned level with the second junction zone.

According to another characteristic, the hydrogen supply device comprises at least one electrical cable having a segment for each container in which the electrical cable is present among the upstream, downstream and intermediate containers, as well as a connector which connects the various segments in pairs.

According to another characteristic, each of the upstream and downstream containers is gas-tight and contains a protective atmosphere.

According to another characteristic, for at least one junction zone, each connection system comprises a first part joined to a first segment among an upstream segment, a downstream segment and an intermediate segment, which is positioned in a first container among an upstream container, a downstream container and an intermediate container, as well as a second part joined to a second segment among an upstream segment, a downstream segment and an intermediate segment, which is positioned in a second container among an upstream container, a downstream container and an intermediate container; the first and second parts being configured to occupy a connected state, in which the first and second parts cooperate and ensure fluidic continuity between the first and second segments, as well as a disconnected state in which the first and second parts are separated. Furthermore, the first and second containers comprise first and second walls which are brought together when the first and second containers are in an assembled state.

According to another characteristic, the first part of each connection system is positioned level with the first wall and is connected in a leaktight manner to the latter. Furthermore, the second part of each connection system is positioned level with the second wall and is connected in a leaktight manner to the latter.

According to another characteristic, the first part of each connection system is positioned outside the first container, the first segment connected to the first part passing in a leaktight manner through the first wall. Furthermore, the second part of each connection system is positioned inside the second container, the second wall of the second container comprising at least one through-orifice configured to allow the first part of each connection system to penetrate into the second container.

According to another characteristic, the first part of each connection system is positioned outside the first container, the first segment connected to the first part passing in a leaktight manner through the first wall. Furthermore, the second part of each connection system is positioned inside the second container, the second wall of the second container comprising at least one through-orifice configured to allow the first container to be positioned in the second container. Furthermore, the hydrogen supply device comprises a plate which is connected to the first container and is configured to seal the through-orifice in a gas-tight manner when the first container is positioned in the second container.

According to another characteristic, the second container comprises at least one opening positioned so as to be able to access the connection systems from an exterior zone of the second container, as well as a hatch configured to occupy a closed state, in which the hatch closes the opening in a leaktight manner, and an open state in which the hatch uncovers the opening.

According to another characteristic, the first container comprises a partition which divides the first container into a first compartment located between the partition and the first wall, as well as a second compartment on the other side from the first wall, the first part of each connection system being positioned in the first compartment, the first segment connected to the first part passing in a leaktight manner through the partition. Furthermore, the first wall comprises at least one through-orifice to allow the second part of each connection system of the second container to penetrate into the first compartment.

According to another characteristic, the first container comprises at least one first opening positioned so as to be able to access the connection systems from an exterior zone of the first container, as well as a first hatch configured to occupy a closed state, in which the first hatch closes the first opening in a leaktight manner, and an open state in which the first hatch uncovers the first opening.

According to another characteristic, the hydrogen supply device comprises, for each first container, a housing which is joined to the second container and in which the second part of each connection system is positioned, the housing being configured to accommodate a part of the first container.

According to another characteristic, the housing comprises at least one second opening, which is positioned in line with the first opening when the first and second containers are in the assembled state, as well as a second hatch configured to occupy a closed state, in which the second hatch closes the second opening in a leaktight manner, and an open state in which the second hatch uncovers the second opening.

According to another characteristic, the hydrogen supply device comprises at least one gasket interposed between the first container on the one hand, and on the other hand the second container and/or the housing.

The invention also relates to an aircraft comprising at least one hydrogen supply device according to one of the preceding characteristics.

BRIEF DESCRIPTION OF THE DRAWINGS

Other characteristics and advantages of the invention will emerge from the following description of the invention, the description being given only by way of example, with reference to the appended figures in which:

FIG. 3 is a schematic view of a hydrogen supply device illustrating another embodiment of the invention, FIGS. 4A-4C are schematic representations of the various steps of assembling two containers which can be seen in FIG. 3.

DETAILED DESCRIPTION OF THE PREFERRED EMBODIMENTS

Figure 1:
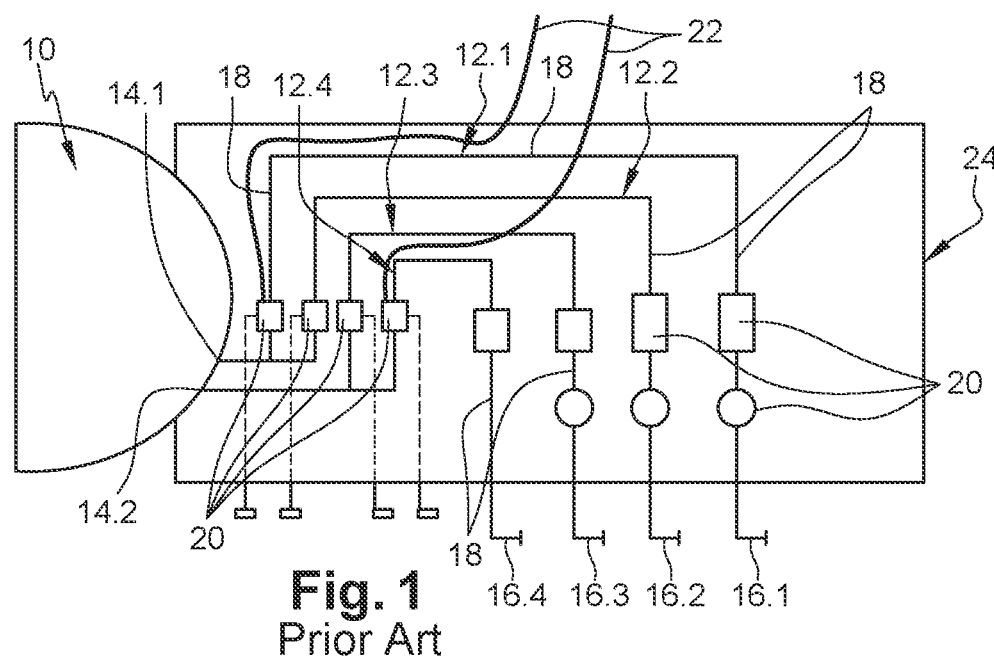
FIG. 1 is a schematic view of a hydrogen supply device illustrating an embodiment of the prior art.

According to the various embodiments which can be seen in FIGS. 2 to 7, a hydrogen supply device 28 comprises at least one hydrogen tank 30 as well as at least one hydrogen circuit 32.1 to 32.4 having at least one upstream end 34.1 to 34.2 connected to the hydrogen tank 30, and at least one downstream end 36.1 to 36.4 connected, for example, to at least one hydrogen engine or to at least one fuel cell.

According to one embodiment, the hydrogen tank 30 comprises a cylindrical lateral wall 30.1, as well as end walls which are positioned at each end of the cylindrical lateral wall 30.1. The hydrogen tank 30 is not described in further detail because it may be identical to those of the prior art.

A hydrogen circuit 32.1 to 32.4 may comprise one or more upstream end(s) 34.1, 34.2. Several hydrogen circuits 32.1 to 32.4 may have the same upstream end 34.1, 34.2. In the same way, a hydrogen circuit 32.1 to 32.4 may comprise one or more downstream end(s) 36.1 to 36.4. Several hydrogen circuits 32.1 to 32.4 may have the same downstream end.

By way of nonlimiting example, the hydrogen supply device 28 comprises four hydrogen circuits 32.1 to 32.4, each of which has a downstream end 36.1 to 36.4, the first and second hydrogen circuits 32.1, 32.2 having the same upstream end 34.1, the third and fourth hydrogen circuits 32.3, 32.4 having the same upstream end 34.2.

The hydrogen supply device 28 comprises first and second equipment items 38, 40 as well as lines 42 which connect the first and second equipment items 38, 40 and, for each hydrogen circuit 32.1 to 32.4, make it possible to convey the hydrogen from the upstream end 34.1, 34.2 to the downstream end 36.1 to 36.4 while passing through the first and second equipment items 38, 40.

The first and second equipment items 38, 40 are selected from among a list of equipment items comprising, in particular, valves, sensors, pumps, heat exchangers, evaporators, connection systems, or the like. This list is not exhaustive.

The first equipment items 38, for example certain valves, belong to a first category of equipment items and are configured to ensure a high level of safety in terms of hydrogen leakage. According to one configuration, each first equipment item 38 comprises at least one leaktight casing, as well as at least one component, which is in contact with the fluid during operation and is positioned in the leaktight casing.

The second equipment items 40, for example certain pumps, belong to a second category of equipment items and are not configured to ensure a high level of safety in terms of hydrogen leakage.

According to one arrangement, each hydrogen circuit 32.1 to 32.4 comprises at least one first equipment item 38, as well as at least one second equipment item 40.

Between their upstream and downstream ends 34.1, 34.2, 36.1 to 36.4, the hydrogen circuits may be independent, may have at least one common segment, and/or may be connected by connection lines.

Figure 2:
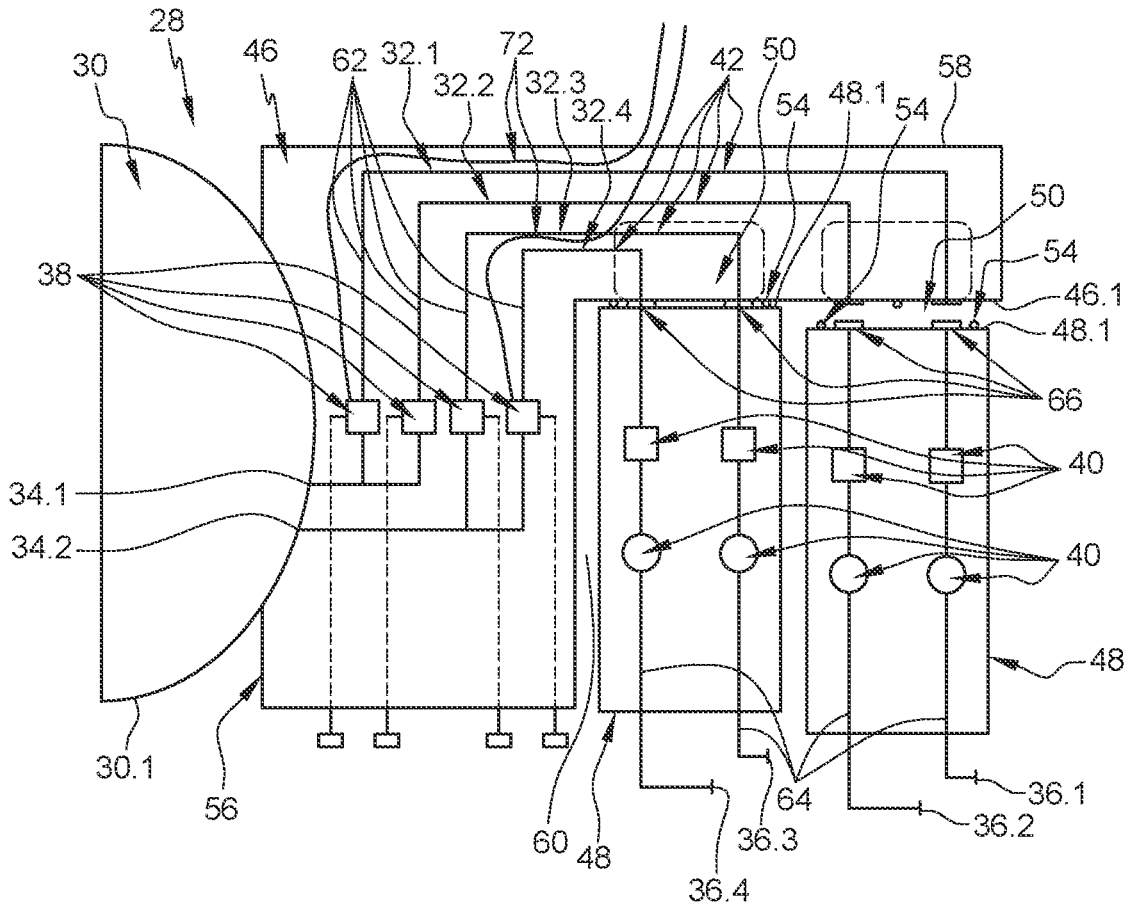
FIG. 2 is a schematic view of a hydrogen supply device illustrating one embodiment of the invention.

According to one embodiment, which can be seen in FIG. 2, the hydrogen supply device 28 comprises at least one upstream container 46 joined to the hydrogen tank 30, at least one removable downstream container 48, the upstream and downstream containers 46, 48 respectively comprising upstream and downstream junction faces 46.1, 48.1 level with a junction zone 50, the upstream and downstream containers 46, 48 being configured to occupy an assembled state, in which the downstream junction face 48.1 of the downstream container 48 and the upstream junction face 46.1 of the upstream container 46 are brought together (or are in contact with one another), as well as a detached state in which the downstream junction face 48.1 of the downstream container 48 and the upstream junction face 46.1 of the upstream container 46 are separated.

Each of the upstream and downstream containers 46, 48 comprises at least one wall delimiting an interior zone and an exterior zone. Each of the upstream and downstream containers 46, 48 is gas-tight and contains a protective atmosphere at least when the upstream and downstream containers 46, 48 are in the assembled state. The protective atmosphere may, for example, be a high vacuum level or an inert gas.

Figures 5, 6:
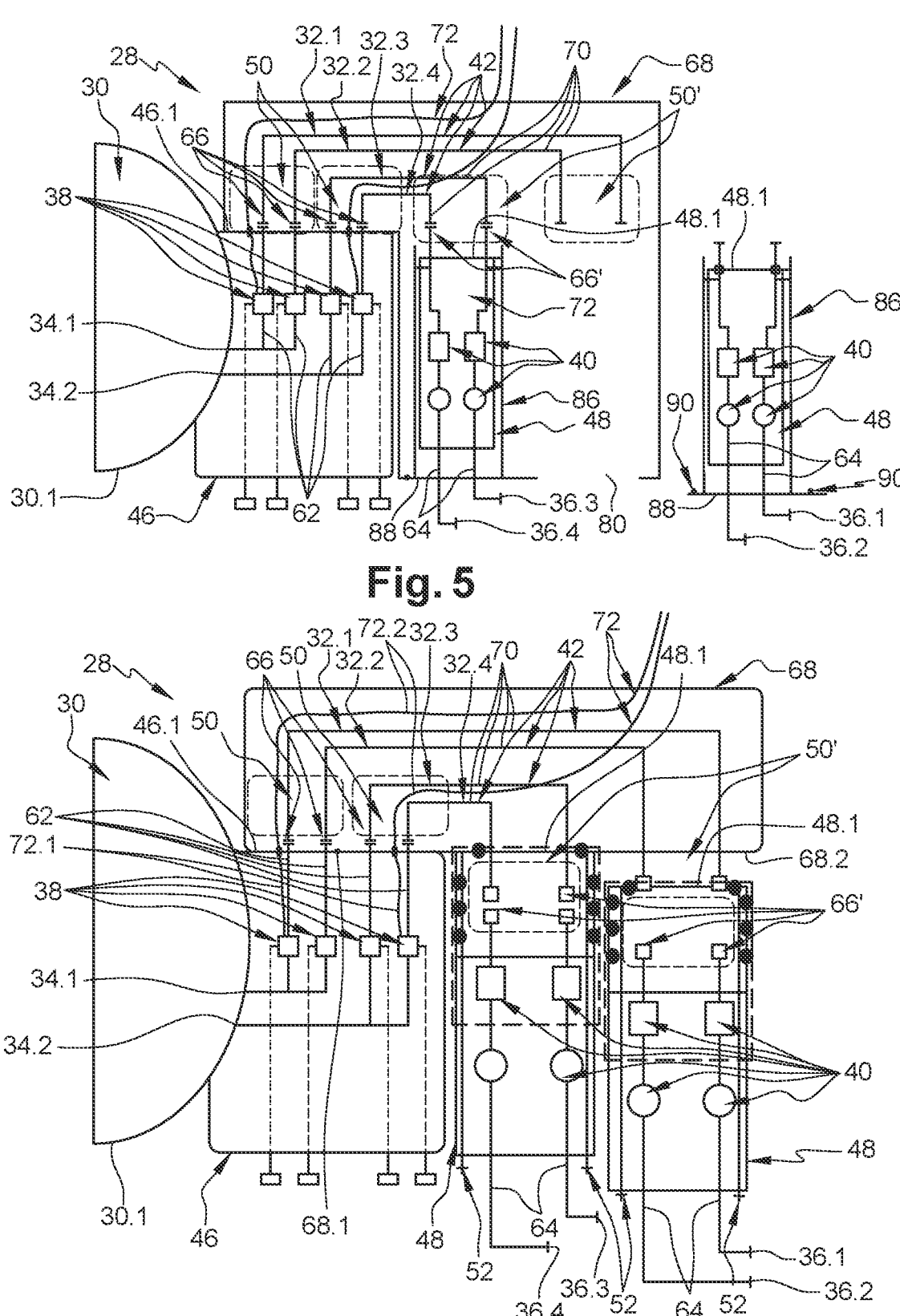
FIG. 5 is a schematic view of a hydrogen supply device illustrating another embodiment of the invention.
FIG. 6 is a schematic view of a hydrogen supply device illustrating another embodiment of the invention.

According to one embodiment, which can be seen in FIG. 6, for example, the hydrogen supply device 28 comprises at least one first releasable linkage 52 for keeping the downstream container 48 in the assembled state. As illustrated in FIG. 2, the hydrogen supply device 28 may comprise at least one gasket 54 interposed between the upstream and downstream containers 46, 48, more particularly, between the upstream and downstream junction faces 46.1, 48.1.

According to one arrangement, the upstream container 46 is laid flat against the cylindrical lateral wall 30.1 of the hydrogen tank 30. According to another arrangement, the upstream container 46 is positioned in extension of the hydrogen tank 30 and is laid flat against an end wall of the hydrogen tank.

According to one configuration, the hydrogen supply device 28 comprises a single upstream container 46 and two downstream containers 48. The invention is not, however, limited to this configuration as regards the number of upstream and downstream containers 46, 48.

According to the embodiments which can be seen in FIGS. 2 to 7, each downstream container 48 has a substantially parallelepipedal shape and a face which corresponds to the downstream junction face 48.1. Of course, the invention is not limited to this geometry for the downstream containers 48.

According to one embodiment, which can be seen in FIG. 2, the upstream container 46 comprises a substantially parallelepipedal body 56, which is attached to the hydrogen tank 30 and is connected to the latter in a gas-tight manner, as well as an extension 58 which communicates with the body 56 and forms with the latter a recess 60 configured to accommodate the downstream containers 48. Thus, the face of the extension 58 that is oriented toward the recess 60 forms the upstream junction face 46.1 of the upstream container 46. Of course, the invention is not limited to this geometry for the upstream container 46. In general, the upstream and downstream containers 46, 48 are configured in order to obtain a compact assembly.

According to one characteristic of the invention, at least one of the hydrogen circuits 32.1 to 32.4 comprises an upstream segment 62 positioned in an upstream container 46, a downstream segment 64 positioned in a downstream container 48, as well as a first connection system 66 which connects the upstream and downstream segments 62, 64 and is positioned level with the junction zone 50 of the upstream and downstream containers 46, 48 when the latter are in the assembled state.

According to one configuration, each of the hydrogen circuits 32.1 to 32.4 of the hydrogen supply device 28 comprises an upstream segment 62 positioned in an upstream container 46, a downstream segment 64 positioned in a downstream container 48, as well as a first connection system 66 which connects the upstream and downstream segments 62, 64 and is positioned level with the junction zone 50 of the upstream and downstream containers 46, 48 when the latter are in the assembled state.

According to one arrangement, the upstream segments 62 of all the hydrogen circuits 32.1 to 32.4 are positioned in the same upstream container 46. The downstream segments 64 of the first and second hydrogen circuits 32.1, 32.2 are positioned in a first downstream container 48, and the downstream segments 64 of the third and fourth hydrogen circuits 32.3, 32.4 are positioned in a second downstream container 48.

According to one configuration, each upstream segment 62 comprises no equipment item 40 of the second category of equipment items. Each upstream segment 62 comprises at least one equipment item 38 of the first category of equipment items. Furthermore, each downstream segment 64 comprises at least one equipment item 40 of the second category of equipment items. According to one arrangement, each downstream segment 64 may comprise at least one equipment item 38 of the first category of equipment items.

According to embodiments which can be seen in FIGS. 3, 5 and 6, the hydrogen supply device 28 comprises at least one removable intermediate container 68 interposed between the upstream and downstream containers 46, 48. The upstream and intermediate containers 46, 68 respectively comprise an upstream junction face 46.1 and a first intermediate junction face 68.1, which are positioned level with a first junction zone 50. The downstream and intermediate containers 48, 68 respectively comprise a downstream junction face 48.1 and a second intermediate junction face 68.2, which are positioned level with a second junction zone 50'. The upstream and intermediate containers 46, 68 are configured to occupy an assembled state, in which the upstream and intermediate containers 46, 68 (and, more particularly, the first intermediate junction face 68.1 of the intermediate container 68 and the upstream junction face 46.1 of the upstream container 46), are brought together (or are in contact with one another) in the first junction zone 50, as well as a detached state in which the upstream and intermediate containers 46, 68 (and, more particularly, the first intermediate junction face 68.1 of the intermediate container 68 and the upstream junction face 46.1 of the upstream container 46) are separated. The downstream and intermediate containers 48, 68 are configured to occupy an assembled state, in which the downstream and intermediate containers 48, 68 (and, more particularly, the downstream junction face 48.1 of the downstream container 48 and the second intermediate junction face 68.2 of the intermediate container 68) are brought together (or are in contact with one another) in the second junction zone 50', as well as a detached state in which the downstream and intermediate containers 48, 68 (and, more particularly, the downstream junction face 48.1 of the downstream container 48 and the second intermediate junction face 68.2 of the intermediate container 68) are separated.

Like the upstream and downstream containers 46, 48, each intermediate container 68 comprises at least one wall delimiting an interior zone and an exterior zone. According to one configuration, each intermediate container 68 is gas-tight and contains a protective atmosphere at least when the upstream, intermediate and downstream containers 46, 68, 48 are in the assembled state. This protective atmosphere may, for example, be a high vacuum level or an inert gas.

According to one embodiment, which can be seen in FIG. 6, for example, the hydrogen supply device 28 comprises at least one first releasable linkage 52 for connecting the downstream and intermediate containers 48, 68 and keeping them in the assembled state. Furthermore, the hydrogen supply device 28 comprises at least one second releasable linkage for connecting the upstream and intermediate containers 46, 68 and keeping them in the assembled state. According to one embodiment, which can be seen in FIG. 6, for example, the hydrogen supply device 28 comprises at least one first gasket 54 interposed between the downstream and intermediate containers 48, 68, more particularly between the downstream junction face 48.1 and the second intermediate junction face 68.2. Furthermore, the hydrogen supply device 28 may comprise at least one second gasket interposed between the upstream and intermediate containers 46, 68, more particularly between the upstream junction face 46.1 and the first intermediate junction face 68.1.

When there is an intermediate container 68, the upstream container 46 is substantially parallelepipedal and has a face that corresponds to the upstream junction face 46.1. Furthermore, the intermediate container 68 has a substantially peripheral shape. It is positioned against the upstream and downstream containers 46, 48 and comprises a face having a first part, which forms the first intermediate junction face 68.1 (turned toward the upstream junction face 46.1), and a second part which forms the second intermediate junction face 68.2 (turned toward the downstream junction face 48.1).

When there is an intermediate container 68, at least one of the hydrogen circuits 32.1 to 32.4 comprises an upstream segment 62 positioned in the upstream container 46, a downstream segment 64 positioned in the downstream container 48, an intermediate segment 70 interposed between the upstream and downstream segments 62, 64 and positioned in an intermediate container 68, a first connection system 66 which connects the upstream and intermediate segments 62, 70 and is positioned level with a first junction zone 50 (when the upstream and intermediate containers 46, 68 are in the assembled state), as well as a second connection system 66' which connects the downstream and intermediate segments 64, 70 and is positioned level with a second junction zone 50' (when the downstream and intermediate containers 48, 68 are in the assembled state).

According to one configuration, each of the hydrogen circuits 32.1 to 32.4 of the hydrogen supply device 28 comprises an upstream segment 62 positioned in an upstream container 46, a downstream segment 64 positioned in a downstream container 48, an intermediate segment 70 interposed between the upstream and downstream segments 62, 64 and positioned in an intermediate container 68, a first connection system 66 which connects the upstream and intermediate segments 62, 70 and is positioned level with a first junction zone 50 (when the upstream and intermediate containers 46, 68 are in the assembled state), as well as a second connection system 66' which connects the downstream and intermediate segments 64, 70 and is positioned level with a second junction zone 50' (when the downstream and intermediate containers 48, 68 are in the assembled state).

According to one embodiment, each intermediate segment 70 comprises only lines 42. Each intermediate segment 70 comprises no equipment item 40 of the second category of equipment items.

Irrespective of the embodiment, the hydrogen supply device 28 comprises at least one upstream container 46 joined to the hydrogen tank 30, as well as at least one removable downstream container 48, the upstream and downstream containers 46, 48 being configured to occupy an assembled state, in which the upstream and downstream containers 46, 48 are connected (directly or by means of an intermediate container 68), and a detached state in which the upstream and downstream containers 46, 48 are not joined.

According to one configuration, which can be seen in FIGS. 2, 3, 5 and 6, the hydrogen supply device 28 comprises at least one electrical cable 72 having at least one segment 72.1, 72.2. Each of these electrical cables 72 has a first end connected to a first or second equipment item 38, 40, as well as a second end connected to an element (not represented) located outside the upstream, downstream and intermediate containers 46, 48, 68. Thus, each electrical cable 72 passes in a leaktight manner through the wall of one of the upstream, downstream and intermediate containers 46, 48, 68. According to one arrangement, an electrical cable 72 comprises a plurality of segments 72.1, 72.2, one segment for each container in which the electrical cable 72 is present among the upstream, downstream and intermediate containers 46, 48, 68, as well as a connector 74 which connects the segments in pairs, one connector 74 for each junction zone 50, 50' passed through.

As illustrated in FIGS. 4 and 7, each connection system 66, 66' comprises a first part 76.1 joined to a first segment T1 among an upstream segment 62, a downstream segment 64 and an intermediate segment 70, as well as a second part 76.2 joined to a second segment T2 among an upstream segment 62, a downstream segment 64 and an intermediate segment 70; the first and second parts 76.1, 76.2 being configured to occupy a connected state, in which they cooperate and ensure fluidic continuity between the first and second segments T1, T2, as well as a disconnected state in which they are separated.

Each junction zone 50, 50' comprises a first wall 78.1 forming part of a first container C1 among the upstream, downstream and intermediate containers 46, 48, 68 and having a face which corresponds to one of the faces among the upstream junction face 46.1, the downstream junction face 48.1, the first and second intermediate junction faces 68.1, 68.2, as well as a second wall 78.2 forming part of a second container C2 among the upstream, downstream and intermediate containers 46, 48, 68 and having a face which corresponds to one of the faces among the upstream junction face 46.1, the downstream junction face 48.1, the first and second intermediate junction faces 68.1, 68.2. The first and second walls 78.1, 78.2 are brought together (or are in contact with one another) when the first and second containers C1, C2 are in the assembled state.

According to a first embodiment, which can be seen in FIG. 2, for at least one junction zone 50, 50', the first part 76.1 of each connection system 66, 66' is positioned level with the first wall 78.1 and is connected in a leaktight manner to the latter. In parallel, the second part 76.2 of each connection system 66, 66' is positioned level with the second wall 78.2 and is connected in a leaktight manner to the latter. Furthermore, each connector 74 comprises a first part 74.1 positioned level with the first wall 78.1 and connected in a leaktight manner to the latter, as well as a second part 74.2 positioned level with the second wall 78.2 and connected in a leaktight manner to the latter, the first and second parts 74.1, 74.2 being configured to occupy a first connected state, in which they cooperate and ensure electrical continuity, as well as a disconnected state in which they are separated.

For at least one junction zone 50, 50', the first and second parts 76.1, 76.2 of each connection system 66, 66' as well as the first and second parts 74.1, 74.2 of each connector 74 are arranged in such a way that, when the containers 46, 48, 68 associated with the first and second walls 78.1, 78.2 are in the assembled state, the first and second parts 76.1, 76.2, 74.1, 74.2 of each connection system 66, 66' and of each connector 74 are in the connected state.

According to another embodiment, which can be seen in FIGS. 4A-4C, for each connection system 66, 66' of at least one junction zone 50, 50', its first part 76.1 is positioned outside the first container C1 and the first segment T1 connected to this first part 76.1 passes in a leaktight manner through the first wall 78.1. When there is at least one connector 74, its first part 74.1 is positioned outside the first container C1, the cable connected to this first part 74.1 passing in a leaktight manner through the first wall 78.1.

Furthermore, for each connection system 66, 66', its second part 76.2 is positioned inside the second container C2. When there is at least one connector 74, its second part 74.2 is also positioned inside the second container C2. The second wall 78.2 of the second container C2 comprises at least one through-orifice 80 (one through-orifice 80 dedicated to each connection system 66, 66' and each connector 74, or a single through-orifice 80 for all the connection systems 66, 66' and connectors 74) configured to allow the first part 76.1 of each connection system 66, 66' and of each connector 74 to penetrate into the second container C2. For each through-orifice 80, the hydrogen supply device 28 may comprise a gasket 54 interposed between the first and second walls 78.1, 78.2, around the through-orifice 80 in question.

Furthermore, the second container C2 comprises at least one opening 82 which is positioned so as to be able to access the connection systems 66, 66' and the connectors 74 from the exterior zone of the second container C2, as well as a hatch 84 configured to occupy a closed state, in which it closes the opening 82 in a leaktight manner, and an open state in which it uncovers the opening 82.

As illustrated in FIGS. 4A-4C, in order to assemble the first and second containers C1, C2, the first container C1 is positioned in relation to the second container in such a way that the first parts 76.1, 74.1 of the connection systems 66, 66' and of the connectors 74 are positioned adjacent to the single through-orifice 80 or adjacent to each face of the through-orifice 80 dedicated to it, as illustrated in FIG. 4A.

Next, the first and second containers C1, C2 are assembled then the first and second parts 76.1, 74.1, 76.2, 74.2 of the connection systems 66, 66' and of the connector(s) 74 are connected, as illustrated in FIG. 4B. Since the hatch 84 is in the open state, it is possible to access the first and second parts 76.1, 74.1, 76.2, 74.2 in order to connect them.

Finally, as illustrated in FIG. 4C, the hatch 84 is closed and a protective atmosphere may be set up in the second container C2 by creating a suitable vacuum or injecting an inert gas.

According to one configuration, which can be seen in FIG. 3, for the various junction zones 50, 50', the first container C1 corresponds to the upstream or downstream container 46, 48 and the second container C2 corresponds to the intermediate container 68. Thus, the upstream and downstream containers 46, 48 are perfectly leaktight and each contain a protective atmosphere. Insofar as the intermediate container 68 contains only double-walled lines and connection systems 66, 66' of the first category of equipment items (ensuring a high level of safety in terms of hydrogen leakage), it has no need to be perfectly leaktight and to contain a protective atmosphere.

According to another embodiment, which can be seen in FIG. 5, for at least one junction zone 50, 50', for each connection system 66, 66', its first part 76.1 is positioned outside the first container C1 and the first segment T1 connected to this first part 76.1 passes in a leaktight manner through the first wall 78.1 of the first container C1. When there is at least one connector 74, its first part 74.1 is positioned outside the first container C1, the cable connected to this first part 74.1 passing in a leaktight manner through the first wall 78.1.

Furthermore, for each connection system 66, 66', its second part 76.2 is positioned inside the second container C2. When there is at least one connector 74, its second part 74.2 is positioned inside the second container C2. The second wall 78.2 of the second container C2 comprises a through-orifice 80 dimensioned in order to allow the first container C1 to pass through the through-orifice 80 in order to be positioned in the second container C2.

According to this embodiment which can be seen in FIG. 5, the hydrogen supply device 28 comprises at least one structure 86 to which the first container C1 is connected, as well as a plate 88 which is joined to the structure 86 and is configured to seal the through-orifice 80 in a gas-tight manner when the first container C1 is positioned in the second container C2. As a variant, the hydrogen supply device does not comprise a structure 86 but only comprises a plate 88, which may or may not be connected to the first container C1 and is configured to seal the through-orifice 80 in a gas-tight manner, in particular when the first container C1 is positioned in the second container C2.

Furthermore, the second container C2 comprises at least one opening 82 positioned so as to be able to access the connection systems 66, 66' and the connectors 74 from the exterior zone of the second container C2, as well as a hatch 84 configured to occupy a closed state, in which it closes the opening 82 in a leaktight manner, and an open state in which it uncovers the opening 82.

A sealing gasket 90 may be interposed between the plate 88 and the second wall 78.2 of the second container C2, around the through-orifice 80, in order to reinforce the leaktightness.

According to one application, the first container C1 corresponds to the downstream container 48 and the second container C2 corresponds to the intermediate container 68. Furthermore, the upstream container 46 and the intermediate container 68 are connected in the same way as for the embodiment which can be seen in FIGS. 3 and 4.

Figures 7A, 7B:
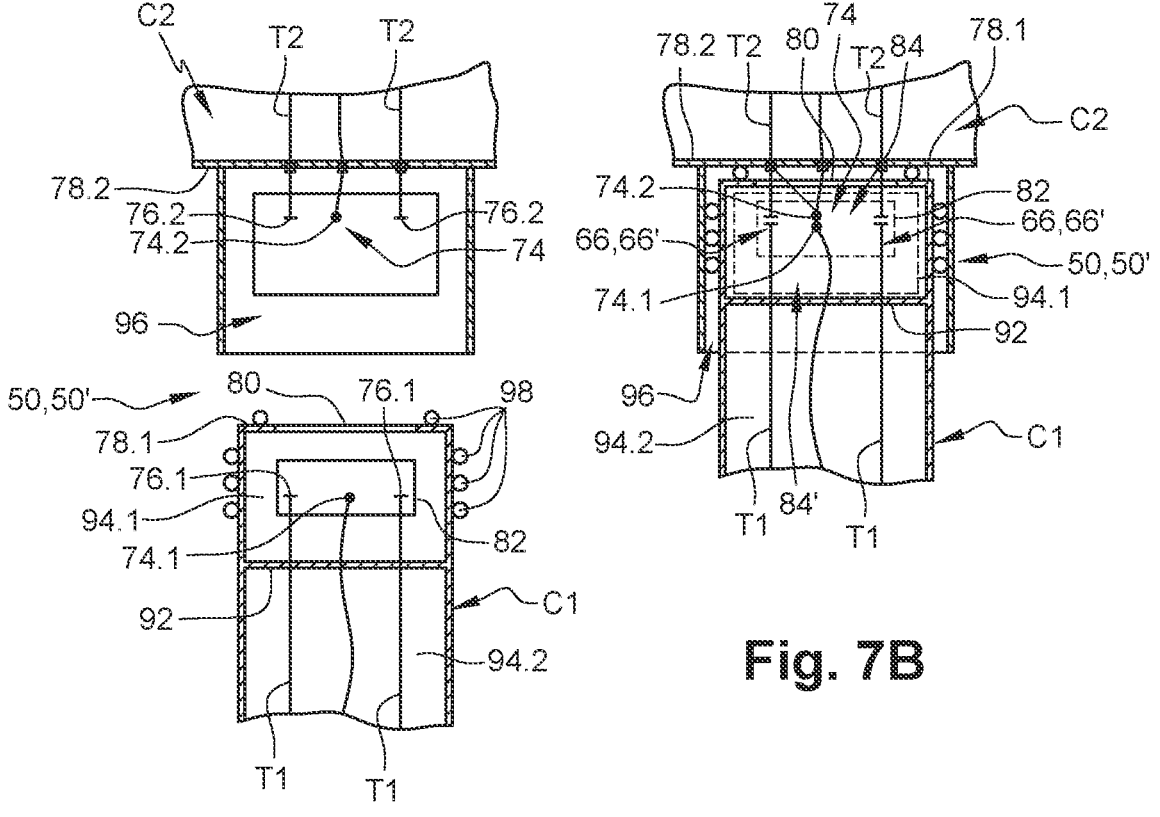
FIGS. 7A and 7B are a schematic representation of the various steps of assembling two containers which can be seen in FIG. 6.

According to another embodiment, which can be seen in FIGS. 6 and 7A and 7B, the first container C1 comprises a partition 92 which is substantially parallel to the first wall 78.1 and divides the first container C1 into a first compartment 94.1 located between the partition 92 and the first wall 78.1, as well as a second compartment 94.2 on the other side from the first wall 78.1. All the equipment items 38, 40 positioned in the first container C1 are located in the second compartment 94.2.

For each connection system 66, 66', its first part 76.1 is positioned in the first compartment 94.1 and the first segment T1 connected to this first part 76.1 passes in a leaktight manner through the partition 92. When there is a connector 74, the first part 74.1 is also positioned in the first compartment 94.1, the cable connected to this first part 74.1 passing in a leaktight manner through the partition 92.

The first wall 78.1 comprises at least one through-orifice 80 to allow the second part 76.2, 74.2 of each connection system 66, 66' and of each connector 74 of the second container C2 to penetrate into the first compartment 94.1.

The first container C1 comprises at least one first opening 82 positioned so as to be able to access, from the exterior zone of the first container C1, the connection systems 66, 66' and the connector(s) 74 located in the first compartment 94.1, as well as a first hatch 84 configured to occupy a closed state, in which it closes the first opening 82 in a leaktight manner, and an open state in which it uncovers the first opening 82.

Furthermore, for each connection system 66, 66', its second part 76.2 is positioned in the exterior zone of the second container C2 and the second segment T2 passes in a leaktight manner through the second wall 78.2 of the second container C2. When there is at least one connector 74, its second part 74.2 is positioned outside the second container C2, the cable connected to this second part 74.2 passing in a leaktight manner through the second wall 78.2.

The hydrogen supply device 28 comprises, for each first container C1, a housing 96 which is joined to the second container C2 and is positioned outside the latter, and in which the second part 76.2, 74.2 of each connection system 66, 66' and of each connector 74 is positioned. The housing 96 is configured to accommodate a part of the first container C1, more particularly its first compartment 94.1. The housing 96 comprises at least one second opening 82', which is positioned in line with the first opening 82 when the first and second containers C1, C2 are in the assembled state, as well as a second hatch 84' configured to occupy a closed state, in which it closes the second opening 82' in a leaktight manner, and an open state in which it uncovers the second opening 82'.

Furthermore, the hydrogen supply device 28 comprises at least one gasket 98 interposed between the first container C1 on the one hand, and on the other hand the second container C2 and/or the housing 96.

As illustrated in FIGS. 7A and 7B, in order to assemble the first and second containers C1, C2, the first container C1 is positioned adjacent to the housing 96 as illustrated in FIG. 7A. The first and second hatches 84, 84' are in the open state and uncover the first and second openings 82, 82'.

Next, the first container C1 is introduced into the housing 96 then the first and second containers C1, C2 are assembled. The first and second parts 76.1, 74.1, 76.2, 74.2 of each connection system 66, 66' and of each connector 74 are connected, as illustrated in FIG. 7B. Since the first and second hatches 84, 84' are in the open state, it is possible to access the first and second parts 76.1, 74.1, 76.2, 74.2 of each connection system 66, 66' and of each connector 74.

Finally, as illustrated in FIG. 4C, the first and second hatches 84, 84' are closed and a protective atmosphere is set up in the first compartment 94.1 of the first container 94 by creating a suitable vacuum or injecting an inert gas.

Irrespective of the embodiment, the downstream containers 48 in which the second equipment items 40 of the second category of equipment items are positioned may be uninstalled and removed from the aircraft without it being necessary to uninstall the hydrogen tank 30. This solution contributes to improving the maintenance of the downstream containers 48, and ultimately of the hydrogen supply device 28.

If there is an intermediate container 68, it is possible to uninstall the hydrogen tank 30 and remove it from the aircraft without it being necessary to uninstall and remove the downstream containers 48.

The positioning of the connection systems 66, 66' and the connectors 74 outside the upstream and downstream containers 46, 48 makes it possible to guarantee leaktightness of the upstream and downstream containers 46, 48 before their assembly. Since the lines 42 and the connection systems 66, 66' present in the intermediate container 68 are all configured to ensure a high level of safety in terms of hydrogen leakage, the intermediate container 68 does not need to have a high degree of leaktightness and to contain a protective atmosphere.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A hydrogen supply device comprising:

at least one hydrogen tank, at least one hydrogen circuit, at least one upstream container joined to the hydrogen tank, at least one removable downstream container, the upstream and downstream containers being config- ured to occupy an assembled state, in which the upstream and downstream containers are connected, and a detached state in which the upstream and downstream containers are not joined;

the hydrogen circuit having an upstream segment posi- tioned in the upstream container, a downstream segment positioned in the downstream container, as well as a first connection system which connects the upstream and downstream segments when the upstream and downstream containers are in the assembled state, wherein the hydrogen supply device further comprises at least one removable intermediate container interposed between the upstream and downstream containers, the upstream and intermediate containers being configured to occupy an assembled state, in which the upstream and intermediate containers are brought together in a first junction zone, as well as a detached state in which the upstream and intermediate containers are separated, the downstream and intermediate containers being con- figured to occupy an assembled state, in which the downstream and intermediate containers are brought together in a second junction zone, as well as a detached state in which the downstream and interme- diate containers are separated, the hydrogen circuit having an intermediate segment interposed between the upstream and downstream segments and positioned in the intermediate container, a first connection system which connects the upstream and intermediate seg- ments and is positioned level with the first junction zone, as well as a second connection system which connects the downstream and intermediate segments and is positioned level with the second junction zone.

2. The hydrogen supply device as claimed in claim 1, wherein the upstream and downstream containers respec- tively comprise upstream and downstream junction faces which are positioned level with a junction zone and are brought together in the assembled state, the first connection system being positioned in proximity to the junction zone when the upstream and downstream containers are in the assembled state.

3. The hydrogen supply device as claimed in claim 1, wherein the hydrogen supply device comprises at least one electrical cable having a segment for each container in which the electrical cable is present among the upstream, downstream and intermediate containers, as well as a con- nector which connects various of the segments in pairs.

4. The hydrogen supply device as claimed in claim 1, wherein each of the upstream and downstream containers is gas-tight and contains a protective atmosphere.

5. The hydrogen supply device as claimed in claim 1, wherein, for at least one junction zone, each connection system comprises a first part joined to a first segment among an upstream segment, a downstream segment and an intermediate segment, which is positioned in a first container selected from a group consisting of the upstream container, the downstream container and the at least one intermediate container, as well as a second part joined to a second segment among an upstream segment, a downstream segment and an intermediate segment, which is positioned in a second container selected from the group consisting of: the upstream container, the downstream container and the at least one intermediate container; the first and second parts being configured to occupy a connected state, in which the first and second parts cooperate and ensure fluidic continuity between the first and second segments, as well as a disconnected state in which the first and second parts are separated, and wherein the first and second containers comprise first and second walls which are brought together when the first and second containers are in an assembled state.

6. The hydrogen supply device as claimed in claim 5, wherein the first part of each connection system is posi- tioned level with the first wall and is connected in a leak tight manner to the latter, and wherein the second part of each connection system is positioned level with the second wall and is connected in a leak tight manner to the latter.

7. The hydrogen supply device as claimed in claim 5, wherein the first part of each connection system is posi- tioned outside the first container, the first segment connected to the first part passing in a leak tight manner through the first wall, and wherein the second part of each connection system is positioned inside the second container, the second wall of the second container comprising at least one through-orifice configured to allow the first part of each connection system to penetrate into the second con- tainer.

8. The hydrogen supply device as claimed in claim 5, wherein the first part of each connection system is posi- tioned outside the first container, the first segment connected to the first part passing in a leak tight manner through the first wall, wherein the second part of each connection system is positioned inside the second container, the second wall of the second container comprising at least one through-orifice configured to allow the first container to be positioned in the second container, and wherein the hydrogen supply device comprises a plate configured to seal the through-orifice in a gas-tight manner.

9. The hydrogen supply device as claimed in claim 7, wherein the second container comprises at least one opening positioned so as to be able to access the connection systems from an exterior zone of the second container, as well as a hatch configured to occupy a closed state, in which the hatch closes the opening in a leak tight manner, and an open state in which the hatch uncovers the opening.

10. The hydrogen supply device as claimed in claim 5, wherein the first container comprises a partition which divides the first container into a first compartment located between the partition and the first wall, as well as a second compartment on the other side from the first wall, wherein the first part of each connection system is posi- tioned in the first compartment, the first segment con- nected to the first part passing in a leak tight manner through the partition, and wherein the first wall comprises at least one through- orifice to allow the second part of each connection system of the second container to penetrate into the first compartment.

US 12,565,965 B2

15

11. The hydrogen supply device as claimed in claim 10, wherein the first container comprises at least one first opening positioned so as to be able to access the connection systems from an exterior zone of the first container, as well as a first hatch configured to occupy a closed state, in which the first hatch closes the first opening in a leak tight manner, and an open state in which the first hatch uncovers the first opening.

12. The hydrogen supply device as claimed in claim 10, wherein the hydrogen supply device comprises, for each first container, a housing which is joined to the second container and in which the second part of each connection system is positioned, this housing being configured to accommodate a part of the first container.

13. The hydrogen supply device as claimed in claim 11, wherein the hydrogen supply device comprises, for each first container, a housing which is joined to the second container and in which the second part of each connection system is positioned, this housing being configured to accommodate a part of the first container, and wherein the housing comprises at least one second opening, which is positioned in line with the first opening when the first and second containers are in the assembled state, as well as a second hatch configured to occupy a closed state, in which the second hatch closes the second opening in a leak tight manner, and an open state in which the second hatch uncovers the second opening.

14. The hydrogen supply device as claimed in claim 12, wherein the hydrogen supply device comprises at least one gasket interposed between the first container, and at least one of the second container or the housing.

15. An aircraft comprising at least one hydrogen supply device as claimed in claim 1.

* * * * *